US011930968B2

(12) United States Patent
Clarke

(10) Patent No.: US 11,930,968 B2
(45) **Date of Patent: *Mar. 19, 2024**

(54) ACCESSIBLE TUB AND SHOWER

(71) Applicant: ROCA BATHROOM PRODUCTS INC., Miami, FL (US)

(72) Inventor: Donald H. Clarke, Colleyville, TX (US)

(73) Assignee: ROCA BATHROOM PRODUCTS INC., Miami, FL (US)

(*) Notice: Subject to any disclaimer, the term of this patent is extended or adjusted under 35 U.S.C. 154(b) by 631 days.

This patent is subject to a terminal disclaimer.

(21) Appl. No.: 16/746,290

(22) Filed: Jan. 17, 2020

(65) Prior Publication Data

US 2021/0219787 A1 Jul. 22, 2021

(51) Int. Cl.

| | |
|---|---|
| ***A47K 3/00*** | (2006.01) |
| ***E05B 41/00*** | (2006.01) |
| ***E05B 47/00*** | (2006.01) |
| ***E05B 65/00*** | (2006.01) |

(52) U.S. Cl.

CPC .............. *A47K 3/006* (2013.01); *E05B 41/00* (2013.01); *E05B 47/0046* (2013.01); *E05B 65/00* (2013.01); *E05Y 2201/462* (2013.01); *E05Y 2900/114* (2013.01)

(58) Field of Classification Search

CPC .... A47K 3/006; E05B 47/0046; E05C 19/166
USPC ............................................................... 4/556
See application file for complete search history.

(56) References Cited

U.S. PATENT DOCUMENTS

| | | | | |
|---|---|---|---|---|
| 4,993,087 A * | 2/1991 | Roquebrune | A47K 3/006 | 4/604 |
| 5,056,169 A * | 10/1991 | Roguebrune | A47K 3/006 | 4/584 |
| 5,163,187 A * | 11/1992 | Dannenberg | E06B 7/2318 | 4/557 |
| 5,220,696 A * | 6/1993 | Dannenberg | A47K 3/006 | 49/477.1 |
| 2005/0102746 A1* | 5/2005 | Wright | A47K 3/006 | 4/555 |
| 2005/0237214 A1* | 10/2005 | Sanchirico, Jr. | E05B 65/108 | 70/333 R |
| 2006/0230526 A1* | 10/2006 | Skinner | A47K 3/006 | 4/664 |
| 2010/0325789 A1* | 12/2010 | Ouyoung | A47K 3/006 | 4/555 |
| 2012/0192349 A1* | 8/2012 | Torres | A47K 3/006 | 4/679 |
| 2012/0192350 A1* | 8/2012 | Stafford | A47K 3/006 | 4/556 |

(Continued)

*Primary Examiner* — Lori L Baker
(74) *Attorney, Agent, or Firm* — NIXON PEABODY LLP; Jeffrey L. Costellia

(57) ABSTRACT

A walk-in tub, or combination walk-in tub and shower, having a front wall with an outwardly swinging door permitting easy entry into and egress from the tub by a user and an electromagnetic door latch assembly further comprising a plurality of electromagnetic door latches that are operatively interconnected to an electrical controller, a power supply and a rapid-release touch switch that can be selectively manipulated to interrupt the power supply to the electromagnetic latches, thereby allowing the door to swing open under emergency conditions even when the tub is filled with water.

14 Claims, 6 Drawing Sheets

(56) References Cited

U.S. PATENT DOCUMENTS

| | | | | |
|---|---|---|---|---|
| 2014/0101841 | A1* | 4/2014 | Bentley | A47K 3/02 29/428 |
| 2017/0058577 | A1* | 3/2017 | Ben Abdelaziz | E05B 81/56 |
| 2017/0226784 | A1* | 8/2017 | Davis | E05B 47/00 |
| 2017/0298667 | A1* | 10/2017 | Corwin, Jr. | E05C 19/166 |

* cited by examiner

ACCESSIBLE TUB AND SHOWER

FIELD OF THE INVENTION

This invention relates to a modern tub or tub and shower combination that is easily accessible, embodies improved safety features, and is constructed using solid surface materials that are strong, durable, stain resistant and leak-proof.

DESCRIPTION OF RELATED ART

In the past, bathtubs and hydrotherapy tubs have been provided, for example in hospitals, physical therapy centers and athletic training facilities, and are used for physical therapy or relaxation under the supervision of trained attendants. More recently, jetted bathtubs and hydrotherapy tubs have become more widely available for residential use by the general public as well as for elderly or physically impaired physically individuals. Such tubs typically have higher sidewalls than a conventional bathtub and accommodate a higher water fill level. Such tubs sometimes have a seat built into the tub that is disposed above the interior bottom surface of the tub and a foot-well located in front of the seat. Because tubs with relatively high sidewalls can make it difficult to enter and exit the tub safely, a hinged door is often provided in the front wall of the tub to permit a user to step into or out of the tub over a low sill located beneath the door. The sill is typically not more than about three inches above the interior floor level of the tubs, and such tubs are often referred to as "walk-in tubs."

With conventional walk-in tubs, the door is typically hinged to open inwardly for ingress and egress by the user. A mechanical latch with an external handle is typically provided to hold the door in a closed position when desired. When an inwardly swinging door is closed and the tub is being used, the weight of the water filling the tub above the level of the sill also pushes outwardly against the inside surface of the door and cooperates with a compressible, elastomeric seal installed around the perimeter of the door to prevent water from leaking outwardly around the door. A disadvantage and safety hazard associated with such tubs is that the door is not easily opened until enough water is drained out of the tub to lower the water level inside the tub to the level of the sill beneath the door.

The use of tubs with doors that can be opened to enter or exit the tub has been found to reduce the likelihood that a user will slip and fall while entering or exiting the tub but is not effective for use in an emergency situation where a user is unable to drain the water from a filled tub, open the door inwardly, and then exit according to normal use. Recent experiences have demonstrated that the use of walk-in tubs having inwardly swinging doors can pose a serious risk and be dangerous for the user under some circumstances. For example, in a circumstance where a frail, incapacitated or large person slips off the seat and into the foot well, the user's body may block the door in the tub sidewall and become wedged in the foot well in a position where the user is physically unable to pull herself or himself up sufficiently to extricate themselves from the tub. Also, as a greater portion of the user's body collapses into the foot well, the displaced water causes the water level inside the tub to rise higher, applying even greater pressure against the door.

Accordingly, to promote user safety and avoid unfortunate outcomes previously associated with the use of conventional walk-in bathtubs or tub and shower combinations, a new accessible tub or tub and shower combination is needed that comprises innovative features not previously incorporated into or associated with such products.

SUMMARY OF THE INVENTION

The apparatus of the invention disclosed here is desirably configured as a walk-in bathtub, or as a combination walk-in bathtub and shower, having an outwardly swinging door permitting easy entry into and egress from the tub by a user. In at least one embodiment of the invention, the outwardly swinging door is held in a closed position during use by an electromagnetic door latch assembly comprising at least one, and preferably two or more, electromagnetic door latches that are operatively interconnected to an electrical controller, a power supply and a rapid-release touch switch. The rapid-release touch switch is desirably positioned within easy reach of a user on a top surface of the tub wall so that the user can selectively engage or deactivate the electromagnetic latches. Activation normally occurs prior to filling the tub. Deactivation normally occurs following use and draining of water from the tub. However, during an emergency, a user can press the rapid-release touch switch to deactivate the electromagnetic latches even while the tub is still filled with water and the tub drain is closed, thereby allowing the tub door to swing outwardly to an open position whereby water can drain rapidly from the tub. Where permitted by code, the rapid-release touch switch can also interface with a ground fault interrupter circuit (GFIC) to prevent reactivation of the electromagnetic door latches immediately following an emergency use of the rapid-release touch switch under circumstances where drained water may still be present around the tub or adjacent areas.

If desired, a floor drain or an emergency catch basin can optionally be provided under and around the tub to limit the spread of water across the underlying floor surface following an emergency use of the rapid-release touch switch. Similarly, an electronic controller can optionally be programmed to require a successive double-touch of the rapid-release touch switch to avoid accidentally deactivating the electromagnetic latches by a single inadvertent touch during use of the tub. Also, if desired, an audible, visible or electronically transmittable notification alert can be initiated by the electronic controller either simultaneously with, or within a preprogrammed interval following, use of the rapid-release touch switch to drain the tub.

The apparatus of the invention satisfactorily comprises walls, seats and water-contacting surfaces that are fabricated and constructed primarily of solid surface materials. As used in this description, "solid surface materials" refers to materials that are typically non-porous, stain and chemical resistant, do not support bacteria growth, and can be cast, seamed and glued to provide a seamless surface appearance. Solid surface materials typically comprise a natural mineral filler, a resin binder (often modified acrylonitrile and/or polyester) and various pigments, colorants and other additives known to be useful for such applications. Using such materials now allows for fabrication of walk-in tubs having strong, durable and leak-proof unitary bottom, side and end walls, a seat and other visible appearance features. The walk-in tubs and walk-in tub and shower combinations of the invention desirably present a clean look and finish, without a door handle or other door latch hardware being visible from either inside or outside the tub. The subject walk-in tubs and walk-in tub and shower combinations are satisfactorily fitted with conventional, code-approved faucets, shower heads, bath wastes, overflow drains and associated piping that are not shown in all the accompanying drawings but are well known to those skilled in the art. In one embodiment, this invention comprises a walk-in tub and shower combination having an outwardly swinging door, an electromagnetic door latch assembly, a shower head and/or a hose-type sprayer.

BRIEF DESCRIPTION OF THE DRAWINGS

The apparatus of the invention is further described and explained in relation to the following drawings wherein.

DESCRIPTION OF THE PREFERRED EMBODIMENTS

Figure 1:
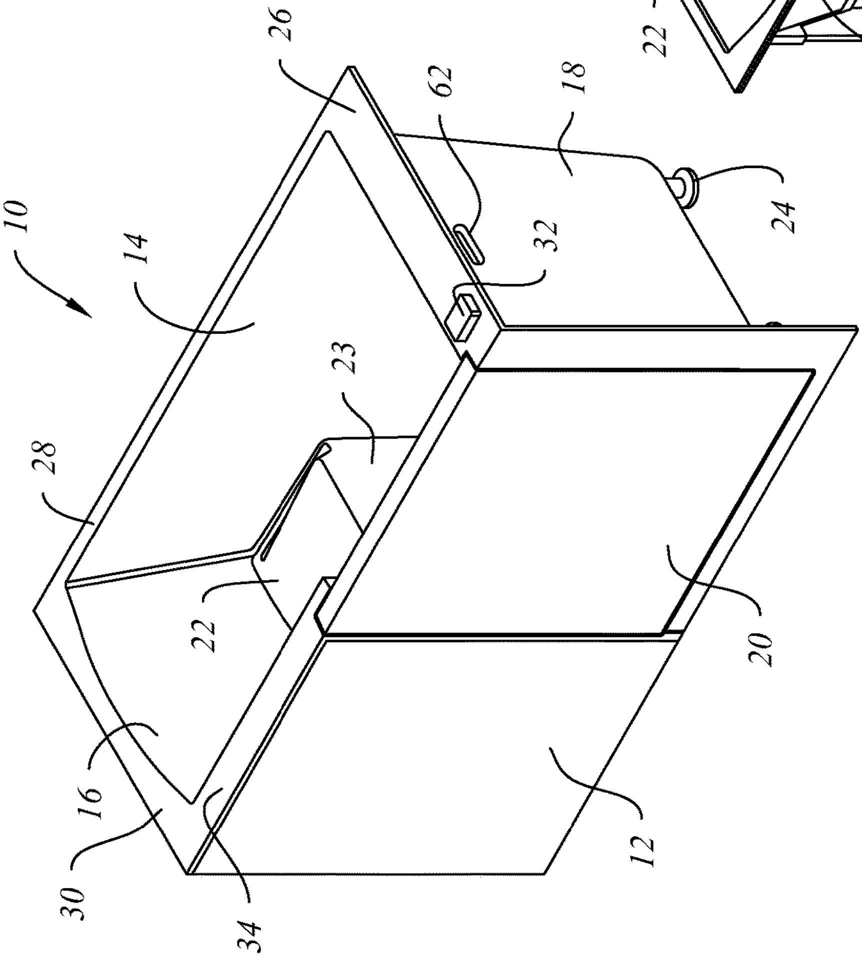
FIG. 1 is a top right front perspective view of a walk-in tub (with the outwardly swinging door closed) made in accordance with one embodiment of the invention.
Figure 2:
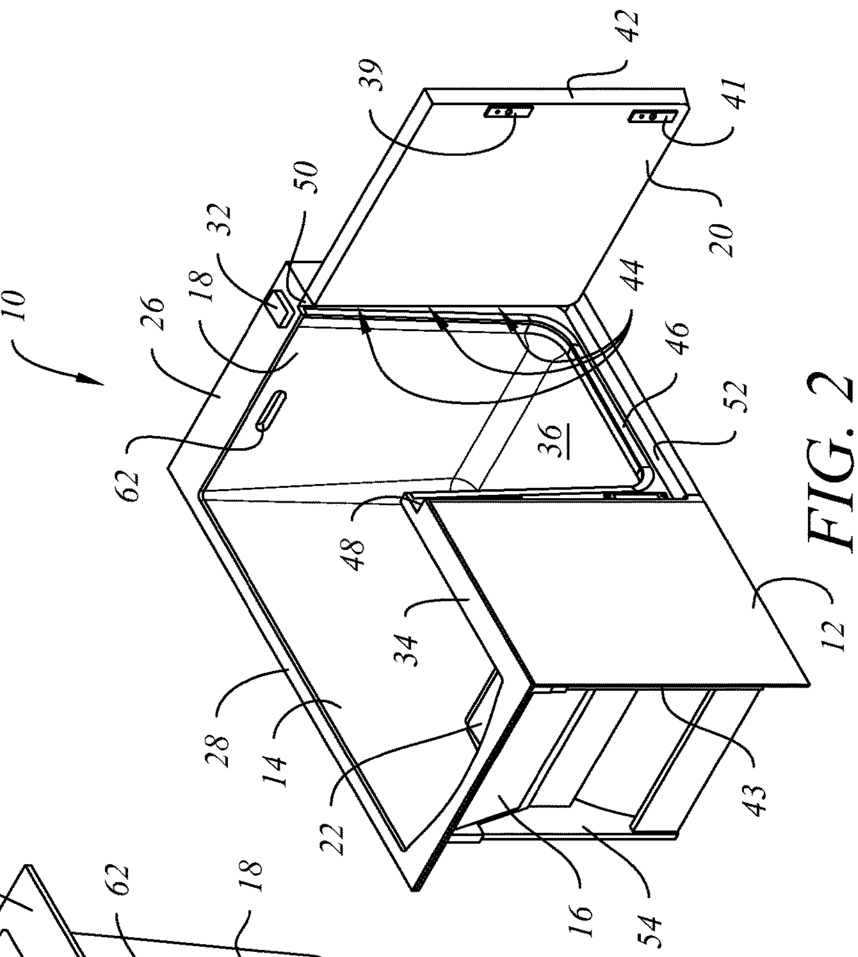
FIG. 2 is a top left front perspective view of the walk-in tub of FIG. 1 with the outwardly swinging door open.
Figure 3:
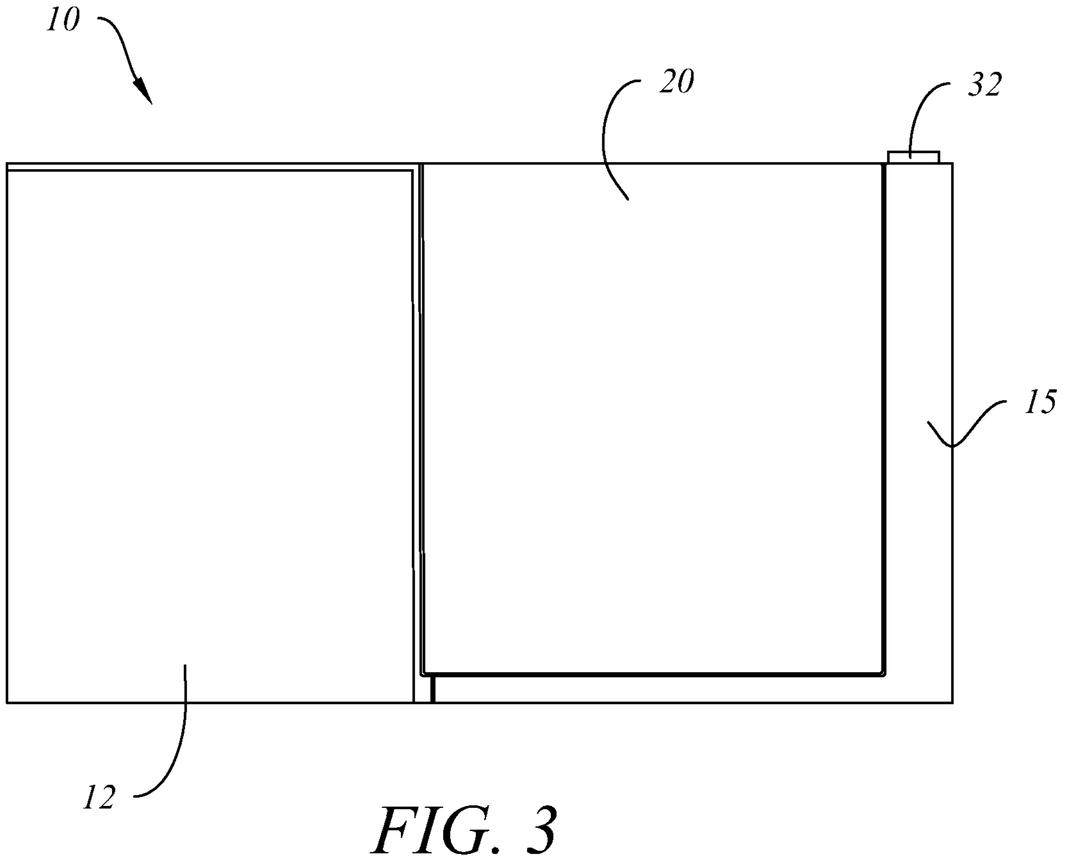
FIG. 3 is a front elevation view of the walk-in tub of FIG. 1.
Figure 4:
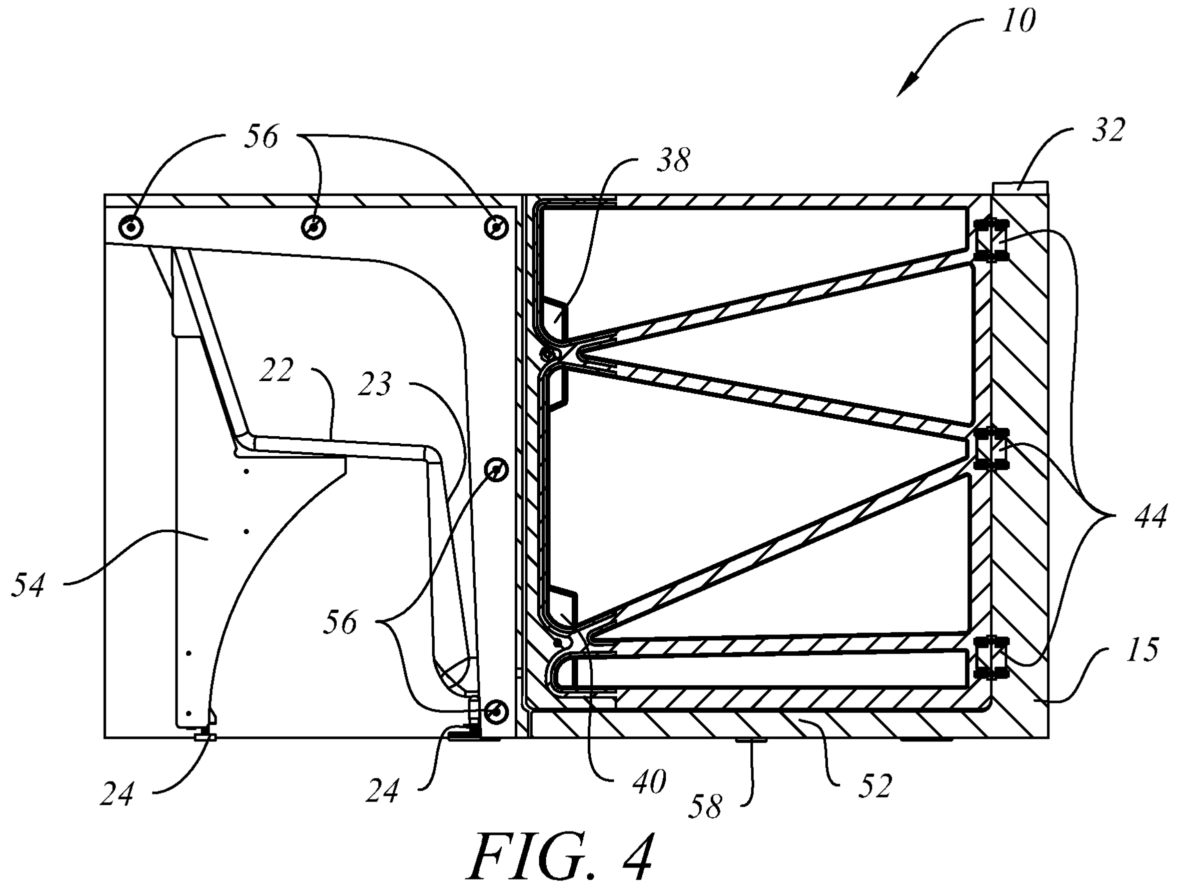
FIG. 4 is front elevation view, with a front wall panel removed and broken away and partially in cross-section, of the walk-in tub of FIG. 3.
Figure 5:
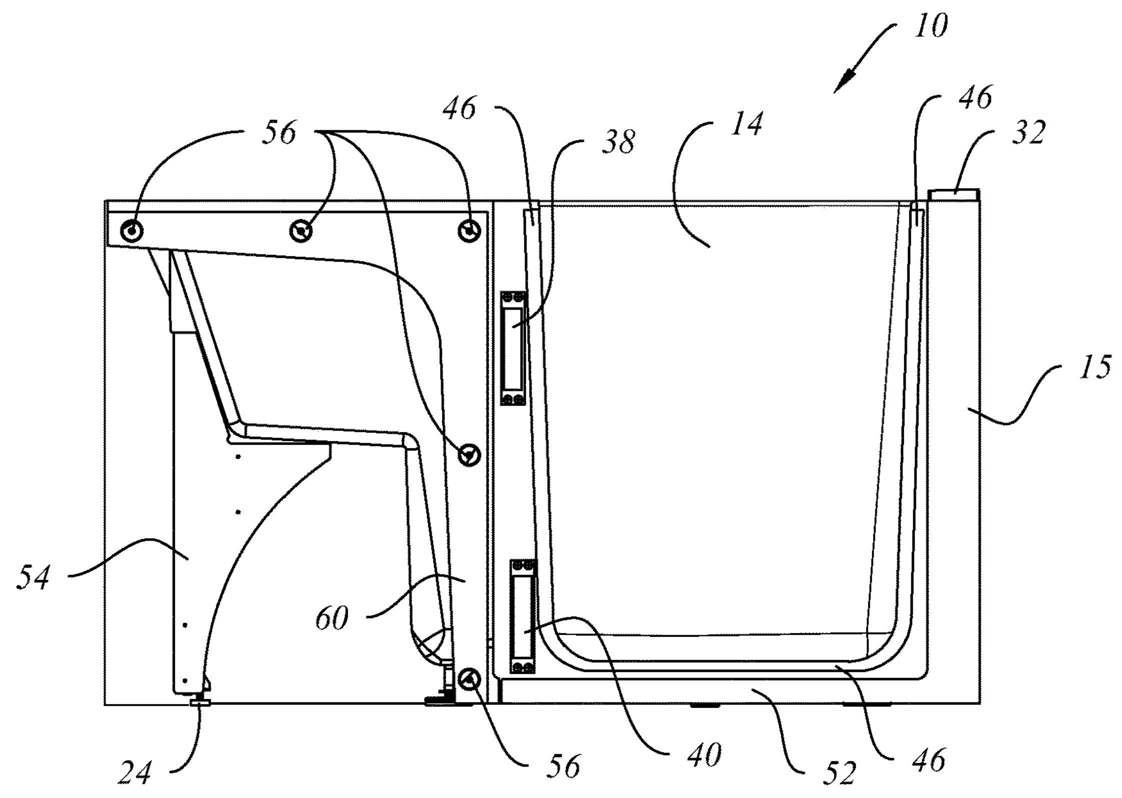
FIG. 5 is a front elevation view of the walk-in tub of FIG. 3, with the left front wall panel and the door broken away.
Figure 6:
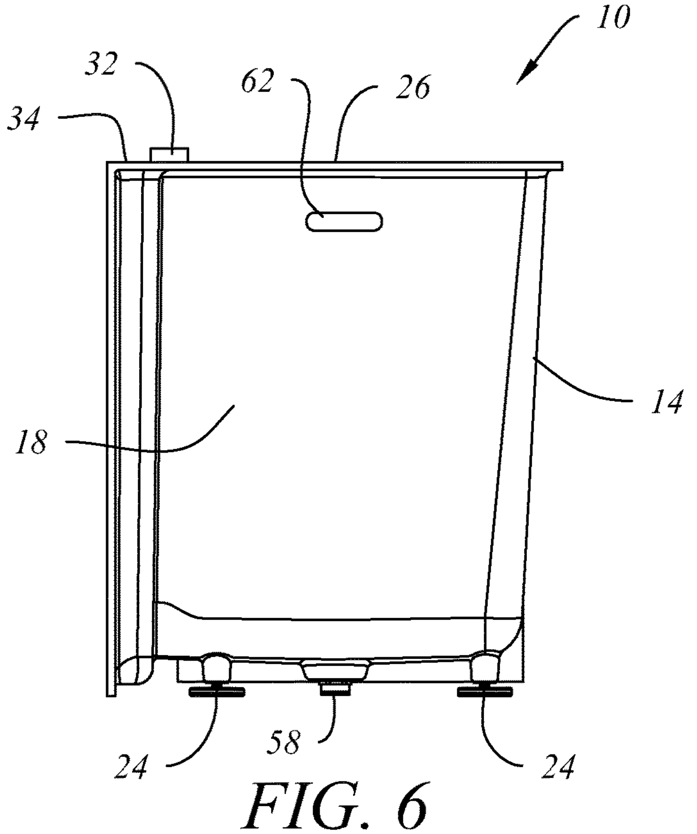
FIG. 6 is a right side elevation view of the walk-in tub of FIG. 1.

Referring to an embodiment of the invention as depicted in FIGS. 1-3, walk-in tub 10 desirably comprises a unitary body with a front tub wall (not visible) covered by detachable front wall panel 12, a back wall 14, opposed end walls 16, 18, bottom wall 36, a top flange further comprising sections 26, 28, 30 and 34 that are contiguous with the front, back and end walls, and a hinged, outwardly swinging door 20. The tub body is desirably supported by threaded adjustable legs 24 (visible in FIGS. 1 and 4-6). Seat surface 22 is desirably contiguous with the front wall (behind detachable front wall panel 12, back 14 and left end wall 16, and is also supported by seat support wall 23 that is contiguous with the front, back and bottom walls. In one satisfactory embodiment of the invention, the principal inside and bottom walls, seat, seat support wall and top flange of walk-in tub 10 are unitarily formed by casting the solid surface material using a variety of molds, and then joining the cast sections to produce a seamless and leak-proof unitary structure. Supplemental structural supports 54, 60 (FIGS. 1, 4-5) can be satisfactorily used to provide additional support beneath seat 22 and left end wall 16 as needed. Referring to FIGS. 4-6, according to one embodiment of the invention, supplemental structural support 60 also provides attachment points for conventional magnets 56 or other quickly releasable hidden fastener devices or materials (snap fasteners or even hook and loop fastening materials) that can be used if desired to secure the back side of detachable front wall panel 12 to support 60 to afford quick and easy access to the underside of that portion of walk-in tub 10 following installation.

Referring to FIG. 6, end wall 18 further comprises overflow port 62 and a conventional non-emergency tub drain 58. Quick-release touch switch 32 is conveniently mounted in or on top flange section 26 near door 20. For clarity and to minimize complexity of the drawings, conventional inlet faucets and associated piping, wiring and hardware are not depicted in the drawings (except in FIG. 9, where a conventional tub inlet faucet and shower head are depicted in a combination walk-in tub and shower 80).

Referring to FIGS. 2-4, the hinge side of door 20 is desirably secured to door support post 15 (FIGS. 3-4) by a plurality of space-apart, concealed hinges 44 that re hidden inside door support post 15 and door 20 and are not visible from inside or outside walk-in tub 10 when door 20 is closed. Door 20 is desirably sized and configured to nest inside recessed channels 48, 50 on each respective side of the door that cooperate with the top surface of door sill 52 to receive and support a U-shaped elastomeric seal 46 that provides a leak-proof water barrier around the side and bottom edges of outwardly swinging door 20 when door 20 is closed and latched. When closed and latched, as best seen in FIGS. 1, 3, 4 and 6, door 20 fits flush with the front-facing surface of detachable front wall panel 12 and provides a clean, hardware-free front face to walk-in tub 10. Referring to FIG. 4, door 20 is preferably constructed with additional cross-bracing disposed between hinges 44 on one side and steel catch plates 39, 41 (FIG. 2) on the other side to provide strength and rigidity needed to keep the door from flexing sufficiently to compromise the waterproof seal provided by compressible elastomeric seal 46 during use.

Figure 7:
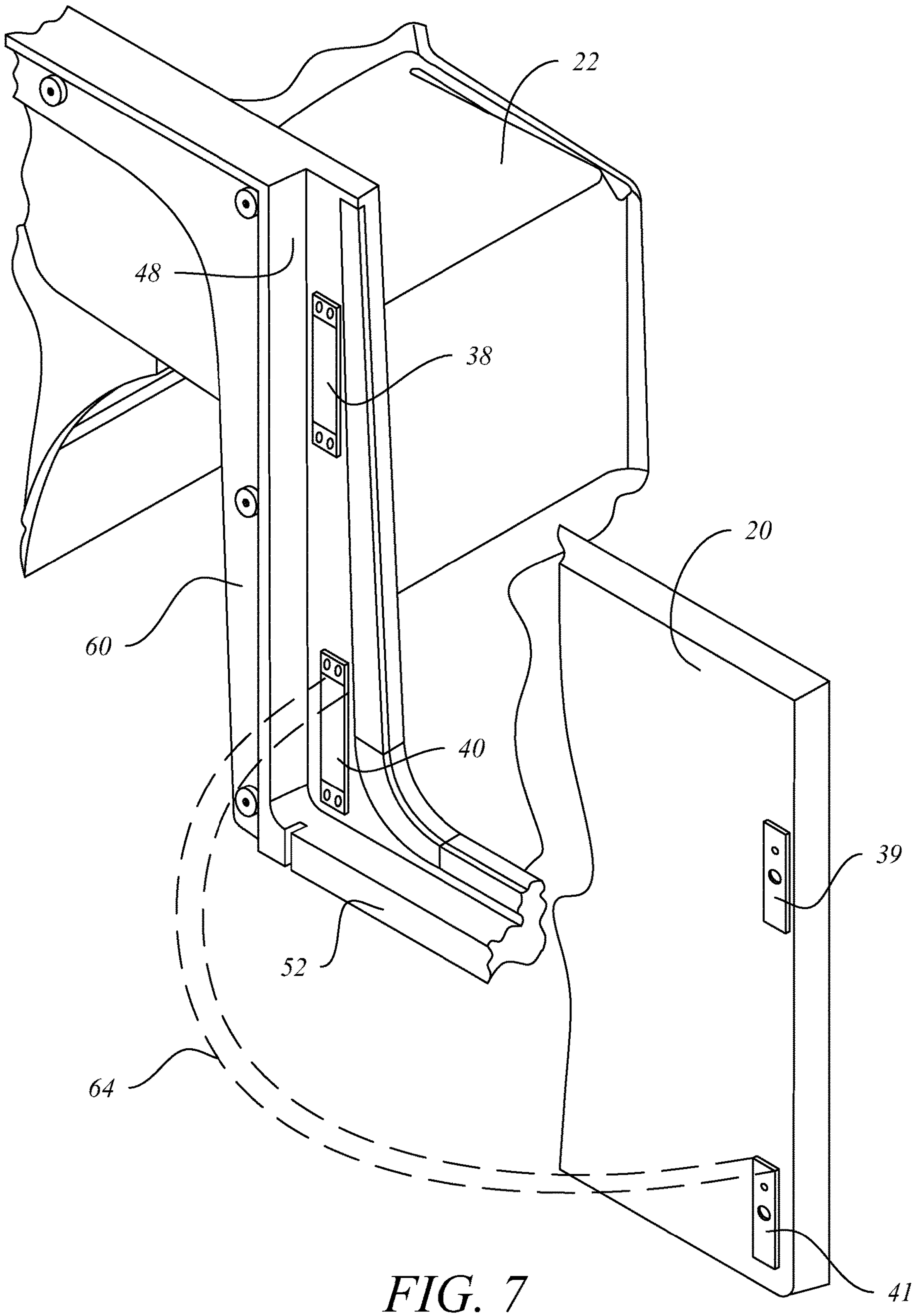
FIG. 7 is an enlarged detail view of a portion of one embodiment of the latch portion of an installed electromagnetic door closure assembly suitable for use in the invention.

Referring next to FIGS. 2, 4-5 and 7, a pair of vertically spaced-apart electromagnetic latches 38, 40 are satisfactorily mounted flush with the outwardly facing surface of recess 48 of walk-in tub 10 and are cooperatively sized and aligned with steel catch plates secured to the inside of door 20 opposite the side where door 20 is hinged to door support post 15. When installed in this manner, steel catch plates 39, 41 will engage and be secured to electromagnetic latches 38, 40, respectively, when electromagnetic latches 38, 40 are energized after door 20 is closed by swinging it through arc 64 as indicated in FIG. 7. Referring to FIGS. 2 and 4-5, when door 20 is closed, the portion of compressible elastomeric seal 46 installed in recess 48 should contact the inside surface of door 20 inwardly of electromagnetic door latches 38, 40 and cooperatively aligned steel catch plates 39, 41 so that when the electromagnetic door latches 38, 40 are energized, seal 46 will be compressed between door 20 and the facing surface of recess 48. Similarly, when door 20 is closed, the portion of the compressible elastomeric seal installed in recess 50 should contact the inside surface of door inwardly of concealed hinges 44 so that when the electromagnetic door latches 38, are energized, seal 46 will be compressed between door 20 and facing surface of recess 50. Referring to FIGS. 4 and 7, door 20 will swing open again when electromagnetic door latches 38, 40 are de-energized, particularly when the fill level of water inside walk-in tub 10 is above the top of door sill 52 (typically about 3 inches above the level of bottom wall 36, depending upon applicable building code requirements).

Figure 8:
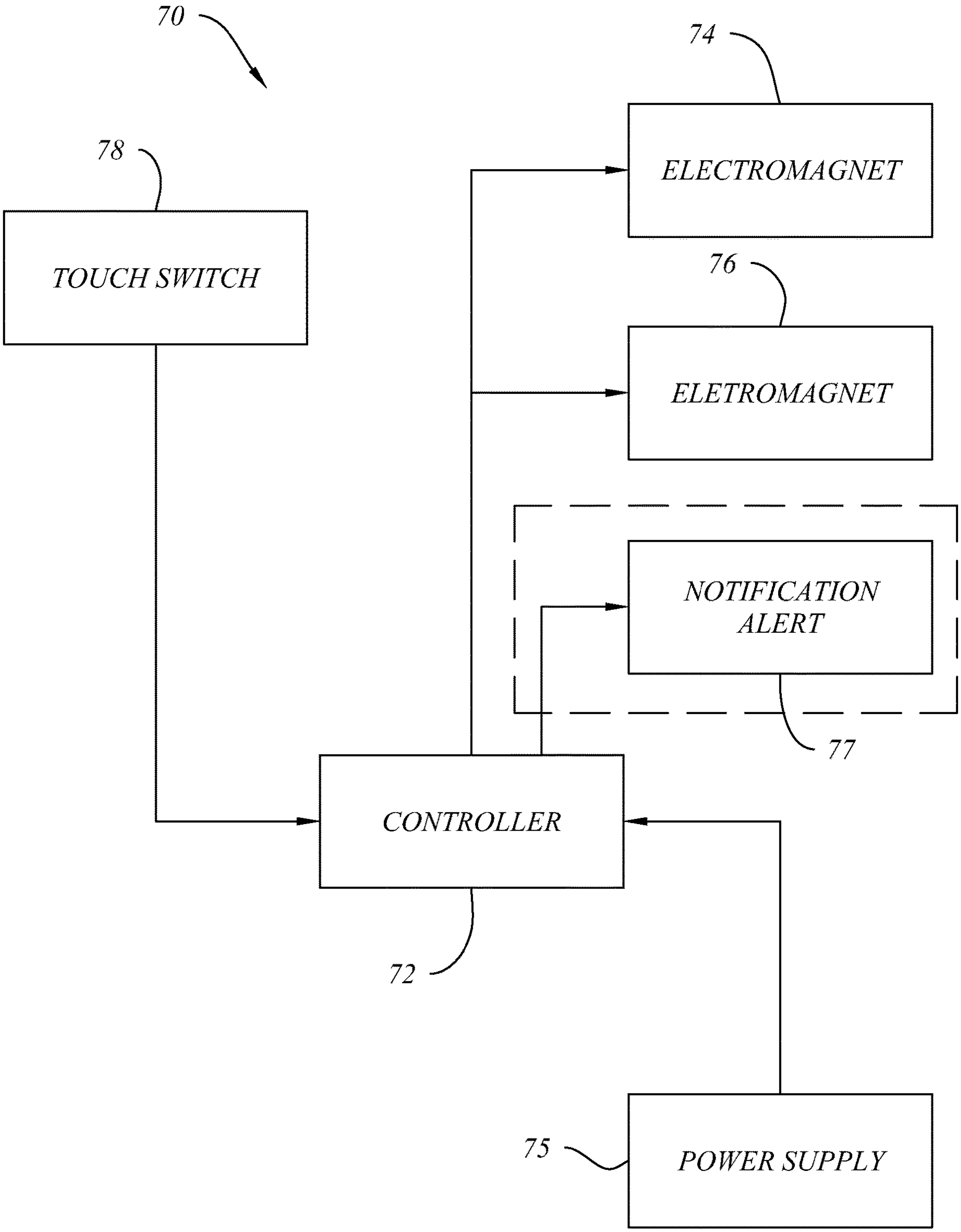
FIG. 8 is a simplified diagrammatic view depicting elements of the electromagnetic door latch assembly.
Figure 9:
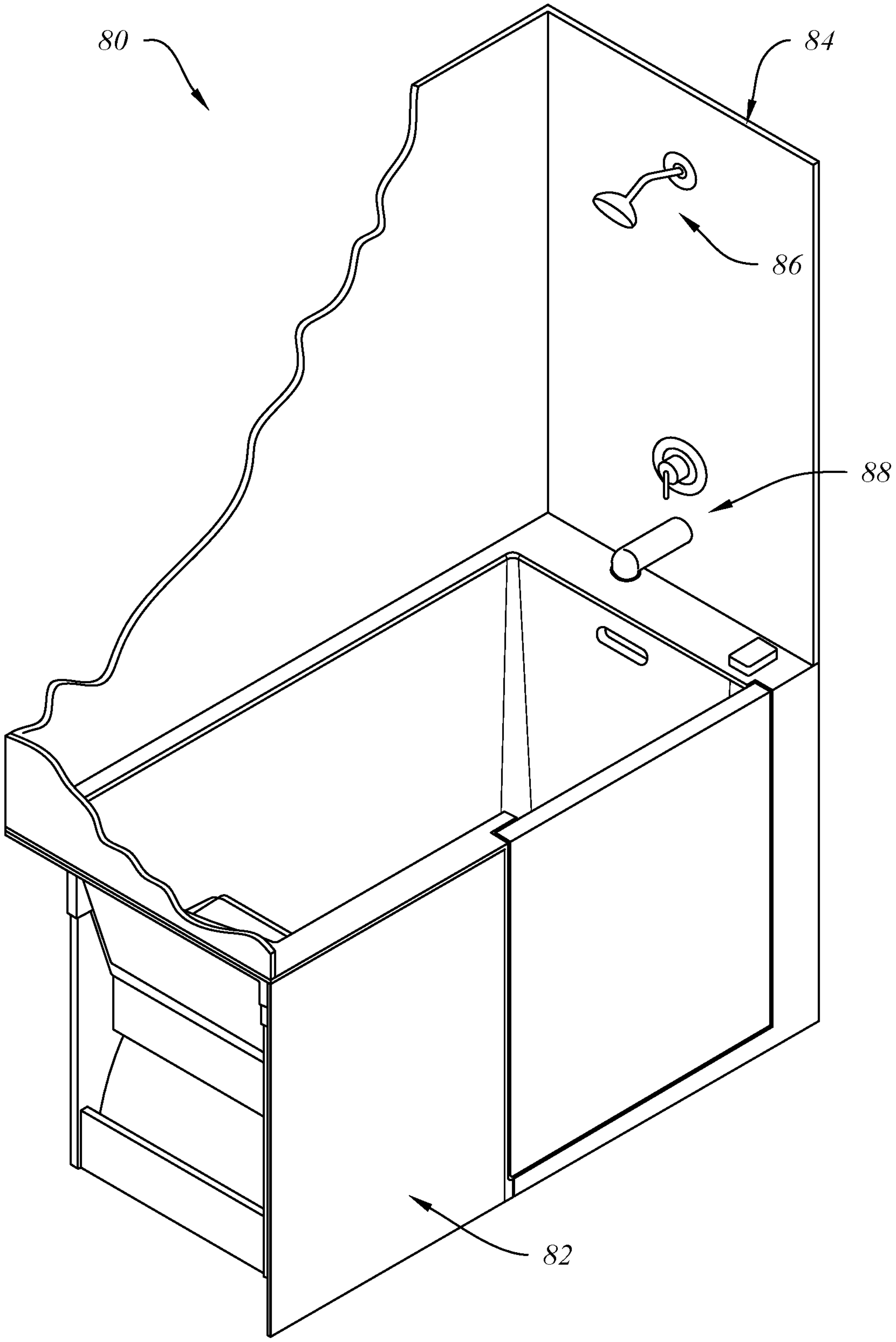
FIG. 9 is a top left front perspective view, partially broken away, of a combination shower and walk-in tub made in accordance with one embodiment of the invention.

Referring to FIG. 9, in another embodiment of the invention, a combination walk-in tub and shower 80 is disclosed in which solid surface shower walls 84 can be extended upwardly from a walk-in tub 82 as previously disclosed in relation to walk-in tub 10. Although shower 84 is depicted in an installation utilizing a conventional wall-mounted faucet 88 and shower head 86 in combination with an outwardly swinging tub door, it should be appreciated by those skilled in the art upon reading this disclosure that a shower with a tub-mounted faucet and a wall-mounted or tub-mounted shower fixture having a hose sprayer can likewise be used within the scope of the present invention Referring to FIG. 8, one satisfactory embodiment of electromagnetic door latch assembly 70 of the invention further comprises operatively interconnected electrical controller 72, a plurality of spaced-apart electromagnets 74, 76 (analogous to electromagnetic door latches 38, 40 discussed above); a touch switch 78 (analogous to quick-release touch switch 32 discussed above); and a power supply 75. Optionally, electromagnetic door latch assembly 70 can further comprise a notification alert that is also responsive to signals received from electrical controller 72. Many types of electromagnets and electrical controllers, power supplies (and battery back-ups for both the electrical controllers and primary power supplies) that are suitable for use in controlling gates and doors are commercially available, although no use of such products for controlling the sequential closing and emergency opening of a door to a walk-in tub or a combination walk-in tub and shower as described in this disclosure is previously known. Satisfactory flush-mount electromagnets suitable for use in the invention can operate on 12 volts DC and can exert a holding force of about 330 lbs per electromagnet.

During use of the walk-in tub of the invention, a user will desirably swing the tub door open and step over the door sill and into the tub, press touch switch 78 to cause electrical controller 72 to energize electromagnets 74, 76 and secure the door in a closed position. The user can then close the drain or bath waste and turn on the faucet to begin filling the tub. In a normal situation, following a bath, the user will open the primary drain or bath waste and wait for the water level to drop below the door sill before pressing touch switch 78 to cause controller 72 to de-energize electromagnets 74, 76, thereby allowing the tub door to swing outwardly on its hinges under a minimal application of pressure to the inside surface of the door (using either a hand or knee as appropriate).

However, if an emergency circumstance occurs and the user slips downwardly off the seat, feels faint or dizzy, or slips and starts to fall while the water level inside the tub is still higher than the door sill, pressing touch switch 78 again will cause controller 72 to immediately de-energize electromagnets 74, 76 and the pressure exerted by the water on the inside of the tub door will force the door open, eliminating any possibility of drowning inside the tub and allowing the user to extricate herself or himself from the walk-in tub. Although water from the tub will quickly drain across the bathroom floor, the additional provision of a floor drain, catch basin, or an optional sensor or switch causing the controller to activate an optional notification alert 77 can help minimize any resultant damage while alerting others to the "situation" and preserving the physical well-being of the user.

Other alterations and modifications of the invention will likewise become apparent to those of ordinary skill in the art upon reading this specification in view of the accompanying drawings, and it is intended that the scope of the invention disclosed herein be limited only by the broadest interpretation of the appended claims to which the inventors and/or Applicant are legally entitled.

What is claimed is:

1. A walk-in tub comprising:

a contiguous bottom, front, back, and end walls;

the front wall comprising a door opening and an outwardly swinging door providing ingress into and egress from the tub;

a touch switch accessibly mounted to facilitate release of the outwardly swinging door; and an electromagnetic door latch assembly comprising operatively interconnected elements comprising at least two spaced-apart electromagnetic door latches, an electrical controller, a power supply and a quick-release touch switch.

2. The walk-in tub of claim 1 wherein the quick-release touch switch is mounted in a position on an end or side wall of the tub wherein the quick-release touch switch is disposed above a maximum desired water fill level of the tub and is readily accessible to a user inside the tub.

3. The walk-in tub of claim 1 wherein the electromagnetic door latch assembly further comprises an operatively interconnected notification alert.

4. The walk-in tub of claim 1 wherein a proximal end of the outwardly swinging door is attached by a plurality of concealed hinges to a side or end wall section of the tub.

5. The walk-in tub of claim 4 wherein the electromagnetic door latches are mounted flush with a mounting surface disposed adjacent to a distal portion of the outwardly swinging door and are not visible when the door is closed.

6. The walk-in tub of claim 5 wherein the electromagnetic door latches are releasably engageable with cooperatively sized and aligned steel catch plates disposed along the distal portion of the outwardly swinging door whenever the electromagnetic door latches are energized by the power supply.

7. The walk-in tub of claim 6 wherein the electromagnetic door latches are selectively disengageable from the steel catch plates by depressing the quick-release touch switch to interrupt the power supply to the electromagnetic door latches.

8. The walk-in tub of claim 1 wherein the contiguous bottom, side and end walls are fabricated from solid surface materials.

9. The walk-in tub of claim 8 further comprising a seat having some portion that is fabricated from solid surface materials and is contiguous with the front, back, bottom and one end wall.

10. The walk-in tub of claim 1 in combination with a shower having a plurality of walls each joined to at least one wall of the tub.

11. The combination walk-in tub and shower of claim 10 wherein at least two shower walls are each joined to at least one wall of the walk-in tub.

12. The walk-in tub of claim 1, further comprising apparatus controllable by the user to selectively fill and drain water from inside the tub.

13. The walk-in tub of claim 10, further comprising at least one shower head or hose-mounted sprayer.

14. The walk-in tub of claim 7, further comprising a battery back-up for at least one of the electrical controller and the power supply.

* * * * *